(12) United States Patent
Fomitchov

(10) Patent No.: US 7,297,910 B2
(45) Date of Patent: Nov. 20, 2007

(54) SYSTEM AND METHOD FOR UTILIZING AN AUTOFOCUS FEATURE IN AN AUTOMATED MICROSCOPE

(75) Inventor: Pavel A. Fomitchov, New York, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/320,676

(22) Filed: Dec. 30, 2005

(65) Prior Publication Data
US 2007/0152130 A1   Jul. 5, 2007

(51) Int. Cl.
G02B 7/04 (2006.01)
G02B 27/40 (2006.01)
G03B 13/00 (2006.01)

(52) U.S. Cl. .............................. 250/201.2; 250/201.4; 348/345

(58) Field of Classification Search .. 250/201.1–201.4; 348/345
See application file for complete search history.

(56) References Cited

U.S. PATENT DOCUMENTS 5,561,498 A * 10/1996 Sekine et al. ................. 396/53
5,774,444 A * 6/1998 Shimano et al. ......... 369/110.02
6,677,565 B1   1/2004 Wahl et al.
6,792,203 B1 * 9/2004 Ide et al. ........................ 396/65
6,819,639 B1 * 11/2004 Gelbart ...................... 369/44.38
7,030,927 B2 * 4/2006 Sasaki ........................ 348/345
7,232,980 B2 * 6/2007 Oshiro et al. ............. 250/201.3
2002/0050518 A1 * 5/2002 Roustaei ..................... 235/454
2004/0125230 A1 * 7/2004 Suda ........................... 348/345

* cited by examiner

Primary Examiner—Thanh X. Luu
Assistant Examiner—Brian J Livedalen
(74) Attorney, Agent, or Firm—Dwayne Bentley

(57) ABSTRACT

The invention relates to a method for adjusting focus in an automated microscope. The method may comprise the steps of: providing an optical detector for image acquisition, wherein the optical detector comprises an array of sensor pixels; designating a region of interest in the array of sensor pixels to emulate a confocal aperture; directing a light beam to illuminate an object according to a predefined pattern, thereby forming an image of the illuminated pattern at the optical detector, wherein the image of the illuminated pattern substantially overlaps the designated region of interest; detecting a light intensity from sensor pixels located within the designated region of interest; and adjusting a relative focal position of an objective lens based on the detected light intensity.

20 Claims, 7 Drawing Sheets

SYSTEM AND METHOD FOR UTILIZING AN AUTOFOCUS FEATURE IN AN AUTOMATED MICROSCOPE

BACKGROUND OF THE INVENTION

Automated microscopes such as confocal laser scanning microscopes and wide-field fluorescence microscopes are powerful imaging tools that are especially valuable for inspection of biological samples. One important component in a typical automated microscope is an autofocusing system. Ideally, the autofocusing system should be able to adjust focus for the microscope's optical system to obtain high-contrast images and should do so in a fast, accurate and reliable manner. However, very few existing autofocusing systems, if any, can meet such requirements in a cost-efficient way. Most known autofocusing systems fall into two categories: image-based or confocal-based, both of which have notable shortcomings.

An image-based autofocusing system may rely on an image-processing algorithm to find a best focus for a microscope. Such an image-based autofocusing system may cause a main optical detector in the microscope to acquire a number of images while an objective lens is moved within its focus range, so that each image corresponds to a different focal position. The contrast of each image is then analyzed and evaluated by applying the image-processing algorithm to the image data. The best focal position is identified as one that corresponds to the strongest contrast in the acquired images. Although such a image-based autofocusing system is usually simple, reliable and inexpensive, it is relatively slow since multiple images have to be acquired and then processed with the complex contrast-evaluation algorithm. In addition, this type of image-based autofocusing cannot be performed during image acquisition (i.e., operate in a "tracking mode") because the main optical detector would not be available for autofocusing operations.

An image-based autofocusing system may also rely on a separate set of hardware (e.g., a separate optical detector and separate optical components) that operates somewhat independently from the microscope's main image acquisition system. This type of autofocusing system is also referred to as a hardware-based system.

FIG. 1 shows a prior art microscope 100 equipped with a hardware-based autofocusing system 120. A main image acquisition system in the microscope 100 comprises a main charge coupled device (CCD) detector 102, a main optical path 104 that comprises an objective lens 110 and other optical elements, a main illumination light source 106, and an object stage 108. The main illumination light source 106 generates a light beam 10 (typically a laser) that is directed, via the main optical path 104, to the object stage 108 to illuminate a sample thereon. An image of the sample is then detected by the main CCD detector 102.

In addition to and independent from the main image acquisition system, the hardware-based autofocusing system 120 provides a secondary image acquisition system that includes a secondary CCD detector 122, a secondary optical path 124 and an autofocus light source 126. The autofocus light source 126 typically generates an autofocus light beam 20 having a different wavelength from the light beam 10 generated by the main illumination light source 106. The autofocus light beam 20 is coupled into the main optical path 104 to illuminate the object stage 108. A resulting image is then detected by the secondary CCD detector 122. A microcontroller (or microprocessor) 128 is available to analyze the autofocus images acquired by the secondary CCD detector 122. The microcontroller 128 is also coupled to a motion control unit 112 that adjusts a relative position of the object stage 108 with respect to the objective lens 110. By coordinating the movement of the object stage 108 and the acquisition and analysis of autofocus images, the microcontroller 128 may quickly identify an optimal focal position that produces the strongest contrast in the autofocus image. It should be noted that a hardware-based autofocusing system, such as the system 120, may also be adapted for confocal-based autofocusing, wherein a physical confocal aperture (not shown) is used and, instead of analyzing entire images, light intensity through the confocal aperture may be analyzed for focus adjustments.

With a secondary image acquisition system dedicated to autofocusing, a hardware-based autofocusing system can zero in on the best focus fairly fast and may also be able to perform focus adjustment when the microscope's main image acquisition system is busy acquiring sample images. However, the dedicated autofocusing hardware also substantially increases the overall complexity and cost of the microscope. Furthermore, a hardware-based autofocusing system is typically incapable of flexible adaptation to different imaging modes the microscope operates in.

Apart from confocal-based autofocusing, there is another type of non-image-based autofocusing approach known as position-sensitive autofocusing. Position-sensitive autofocusing can be used for tracking-mode focus adjustments, and is widely used in optical drives such as compact disk (CD) drives and digital versatile disk (DVD) drives. However, it is very difficult to implement position-sensitive autofocusing in an imaging system with multiple objective lenses.

BRIEF SUMMARY OF THE INVENTION

The present invention is directed to an autofocusing system and method that overcomes these and other drawbacks of known systems and methods.

According to one embodiment, the invention relates to a method for adjusting focus in an automated microscope. The method may comprise the steps of: providing an optical detector for image acquisition, wherein the optical detector comprises an array of sensor pixels; designating a region of interest in the array of sensor pixels to emulate a confocal aperture; directing a light beam to illuminate an object according to a predefined pattern, thereby forming an image of the illuminated pattern at the optical detector, wherein the image of the illuminated pattern substantially overlaps the designated region of interest; detecting a light intensity from sensor pixels located within the designated region of interest; and adjusting a relative focal position of an objective lens based on the detected light intensity.

According to another embodiment, the invention relates to an automated microscope. The automated microscope may comprise: at least one light source that generates a light beam; an optical path and an optical detector for image acquisition, wherein the optical path has an objective lens therein, and wherein the optical detector comprises an array of sensor pixels; a motion mechanism capable of moving the objective lens within a focus adjustment range; and a processor module coupled to the optical detector and the motion mechanism. The processor module may designate a region of interest in the array of sensor pixels to emulate a confocal aperture. The optical path may direct the light beam to illuminate the object according to a predefined pattern, thereby forming an image of the illuminated pattern at the optical detector, wherein the image of the illuminated pattern substantially overlaps the designated region of interest. The processor module may determine a desired relative focal position of the objective lens by coordinating the movement of the objective lens and detection of light intensity from sensor pixels located within the designated region of interest.

According to yet another embodiment, the invention relates to a method for adjusting focus in an automated microscope. The method may comprise the steps of: providing an optical detector for image acquisition, wherein the optical detector comprises an array of sensor pixels; directing a light beam to illuminate an object according to a line pattern, thereby forming a line-shaped image at the optical detector; designating a region of interest in the array of sensor pixels, wherein the designated region of interest crosses the line-shaped image; determining, based on detection data collected from sensor pixels located within the designated region of interest, a width of the line-shaped image and a light intensity associated with the line-shaped image; and adjusting a relative focal position of an objective lens based on the width and the light intensity.

It is a technical advantage of the present invention that an autofocus method and system for an automated microscope is disclosed. It is another technical advantage of the present invention that a pixel-based optical detector is used to emulate a confocal aperture and/or to improve the speed and accuracy of microscope focus adjustments. It is a further technical advantage of the present invention that the autofocus technique may be useful for confocal or wide-field microscopes.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Embodiments of the present invention introduce a new autofocusing technique that not only provides faster and more accurate focus adjustment than existing image-based autofocusing approaches, but does not require a separate detection system as in existing hardware-based autofocusing systems. These advantages are achieved by using a pixel-based optical detector that serves both as a microscope's main detector for image acquisition and as the detector for autofocus purpose. The pixel-based optical detector may comprise a two-dimensional (2-D) array of sensor pixels whose detection data may be selectively accessed. That is, detection data associated with each sensor pixel in the 2-D array is capable of an independent readout and/or reset. One example of a suitable optical detector may be a complementary metal oxide semiconductor (CMOS) detector having a random access feature. Another example of a suitable optical detector may be a charge-coupled device (CCD) detector. The pixel-based optical detector may be positioned in place of a physical confocal aperture and may be programmed to emulate a virtual confocal aperture. Light intensity detected from sensor pixels located within the virtual confocal aperture may be used as a basis for focus adjustments.

Figure 1:
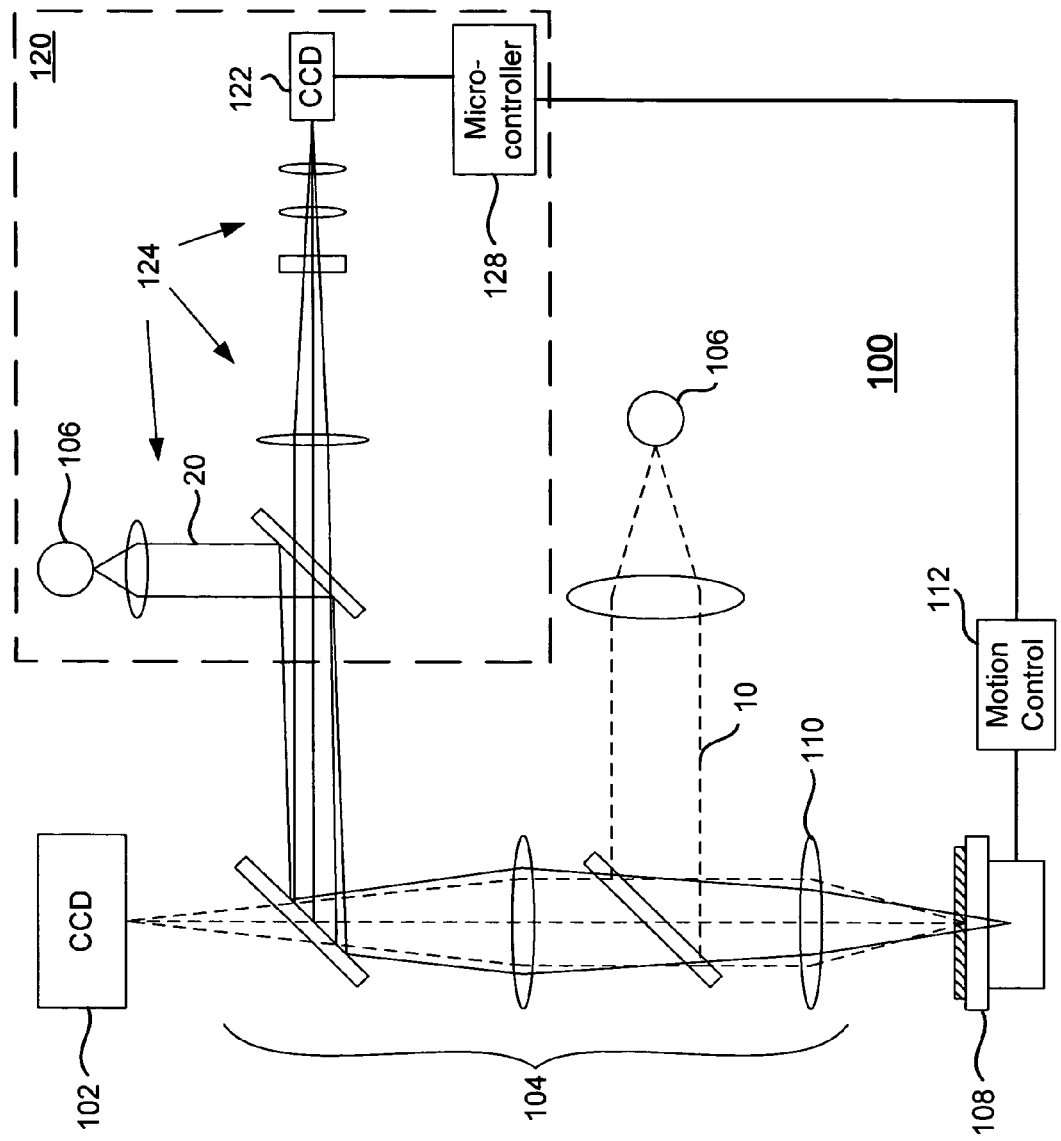
FIG. 1 shows a prior art microscope equipped with a hardware-based autofocusing system.
Figure 2:
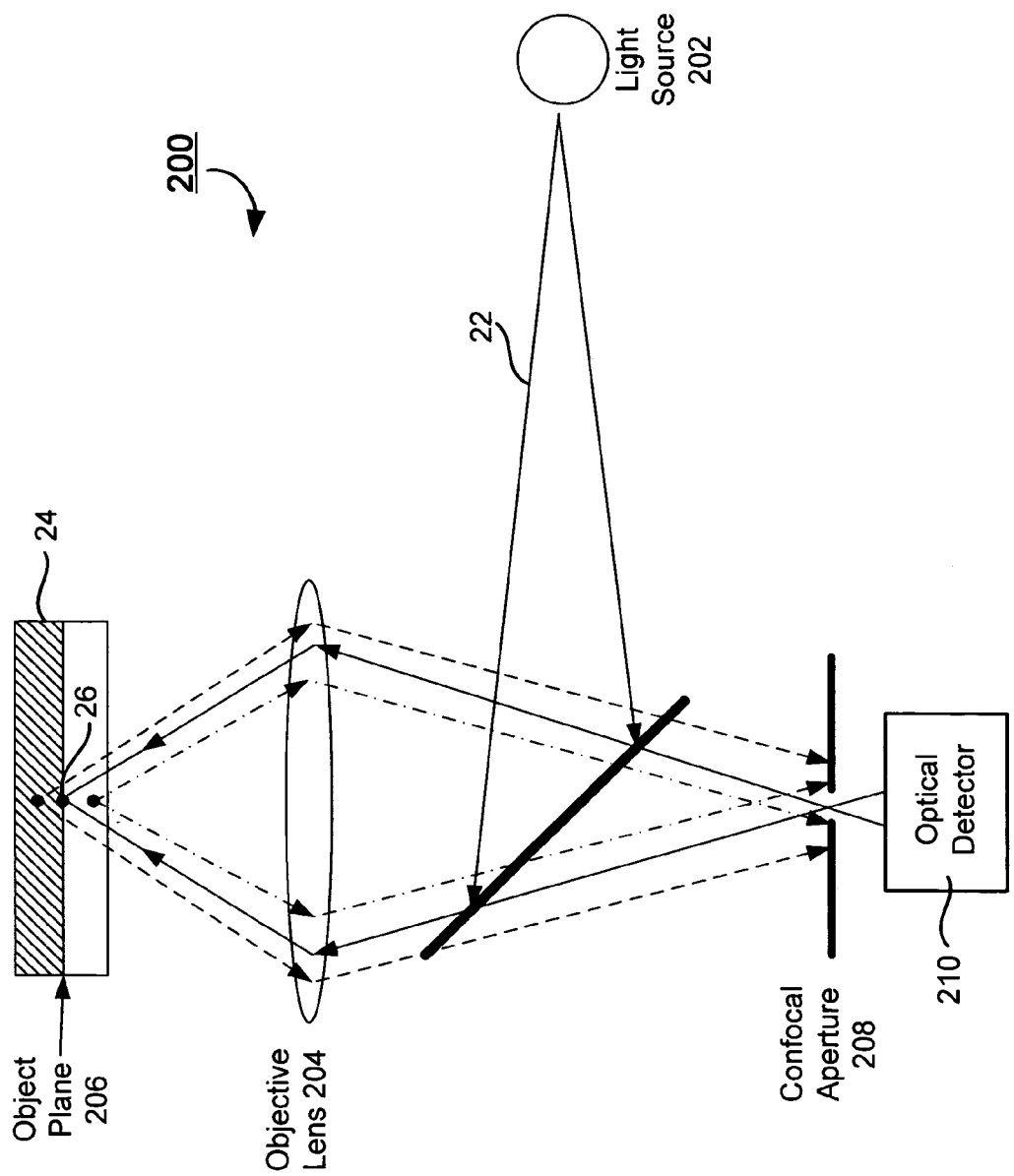
FIG. 2 is a diagram illustrating a prior art method for confocal autofocusing.

FIG. 2 is a diagram illustrating a prior art method for confocal autofocusing. In a simplified autofocusing system 200 (main imaging acquisition system for the microscope not shown), a light source 202 may generate a light beam 22. The light beam 22 may be focused by an objective lens 204 onto an object 24 and illuminate a point 26 on an object 24. An image of the point 26 may be formed on a confocal aperture 208. If the focal plane of the objective lens 204 coincides with the object plane 206, then light beams originating from the point 26 are in focus on the confocal aperture 208. These light beams may produce the highest light intensity and may be detected by an optical detector 210 located behind the confocal aperture 208. Other out-of-focus light beams are blocked by the confocal aperture 210. Focus adjustment for the optical system 200 may involve changing a relative position of the objective lens 204 to find the focal position that produces one of the peaks in the light intensity at the confocal aperture 208.

Figure 3:
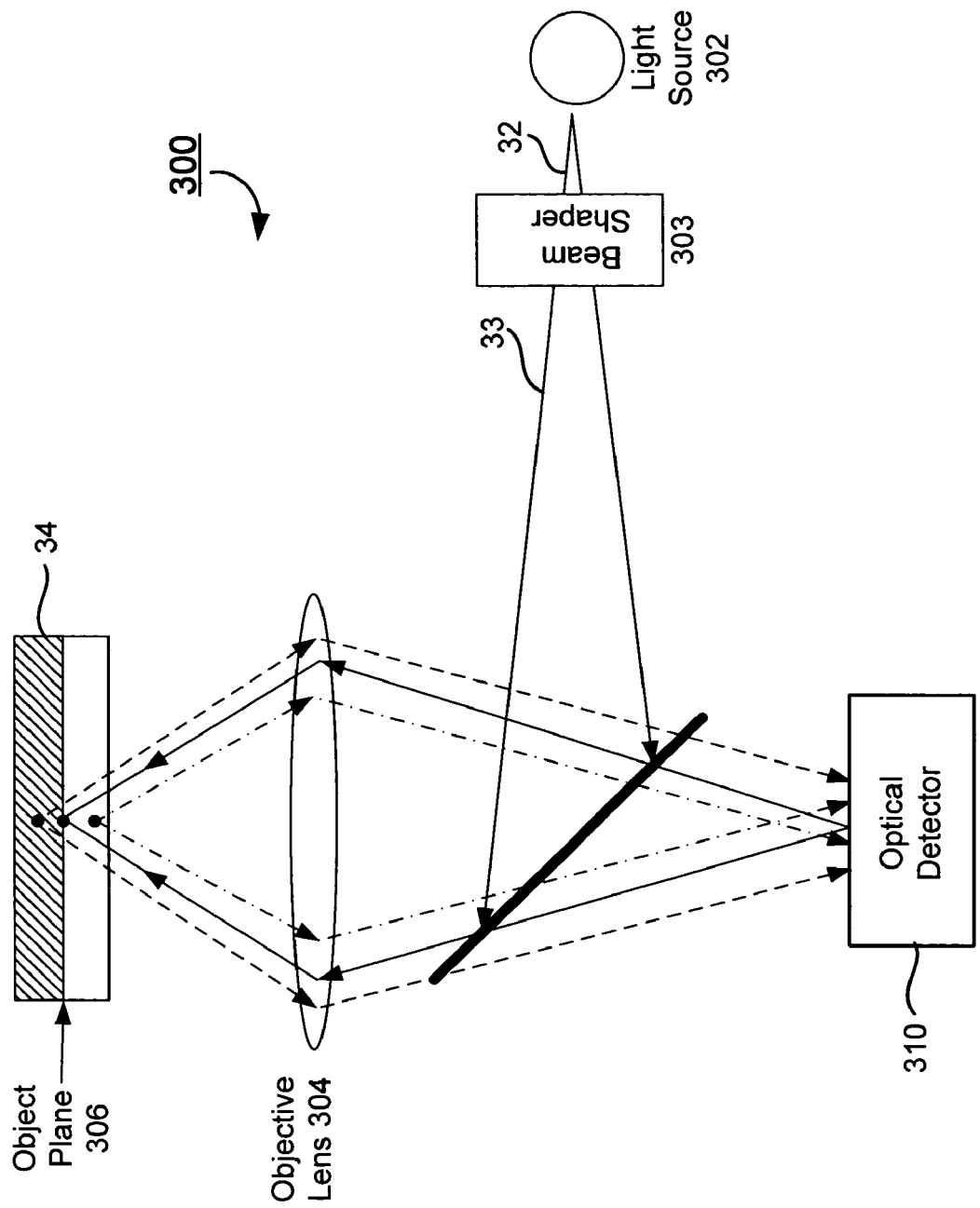
FIG. 3 is a diagram illustrating an exemplary autofocusing method according to an embodiment of the present invention.

FIG. 3 is a diagram illustrating an exemplary autofocusing method according to an embodiment of the present invention. The exemplary method may be implemented with an autofocusing system 300. A light beam 32, generated by a light source 302, may pass through a beam-shaping element 303 that converts the light beam 32 into a light beam 33 that, after passing through an objective lens 304, forms a predefined illumination pattern (e.g., a point, a line, or a rectangular shape) on a object 34. In the autofocusing system 300, a main difference from the prior art autofocusing system 200 (shown in FIG. 2) is that the confocal aperture 208 may be emulated by a pixel-based optical detector 310 having a 2-D array of sensor pixels. The optical detector 310 may be positioned where the physical confocal aperture 208 used to be, wherein detection data associated with the sensor pixels may be selectively accessed. The illuminated pattern on the object 34 may form an image directly on the 2-D array of sensor pixels.

The random access capability of the optical detector 310 may allow selective detection of incident light on the 2-D pixel array. As such, a "virtual confocal aperture" may be flexibly emulated by designating a region of interest (ROI) in the array of sensor pixels. With the emulated confocal aperture, detection signals from those sensor pixels located outside the ROI may be reset to reject out-of-focus light. The shape of the virtual confocal aperture (or ROI) may be the same as or similar to the predefined pattern, and may be determined based on the operation mode of a microscope in which this exemplary method is implemented. For example, if the microscope operates in a point-confocal mode, the illuminated pattern and the ROI may be configured to have a point-like shape. If the microscope operates in a line-confocal mode, the illuminated pattern and the ROI may be shaped into a line. Both the illuminated pattern and the ROI are typically centered in a field of view of the microscope. The size of the ROI may be the same as or smaller than the image of the illuminated pattern. A search for a desired focus may involve detection of light intensity from those sensor pixels located within the ROI together with a synchronized movement of the objective lens 304. An optimal focal position of the objective lens 304 may be identified as one that produces one of the peaks in the light intensity inside the virtual confocal aperture.

Focus adjustment according to the exemplary method illustrated in FIG. 3 may be faster than traditional image-based autofocusing systems for a number of reasons. For example, the detection data may be read out fairly fast because, instead of collecting data from the entire sensor pixel array, only data from those sensor pixels within the ROI are read out. In addition, no extensive image processing is required. Compared to hardware-based autofocusing systems, the exemplary method in FIG. 3 does not require a separate optical detector or optical system to be dedicated to autofocusing. Instead, the autofocusing function may be implemented with the microscope's main image acquisition system. The autofocusing system 300 shown in FIG. 3 may actually be a microscope's main image acquisition system as well. For example, the optical detector 310 may be the main optical detector that also serves the autofocusing purposes.

Figure 4:
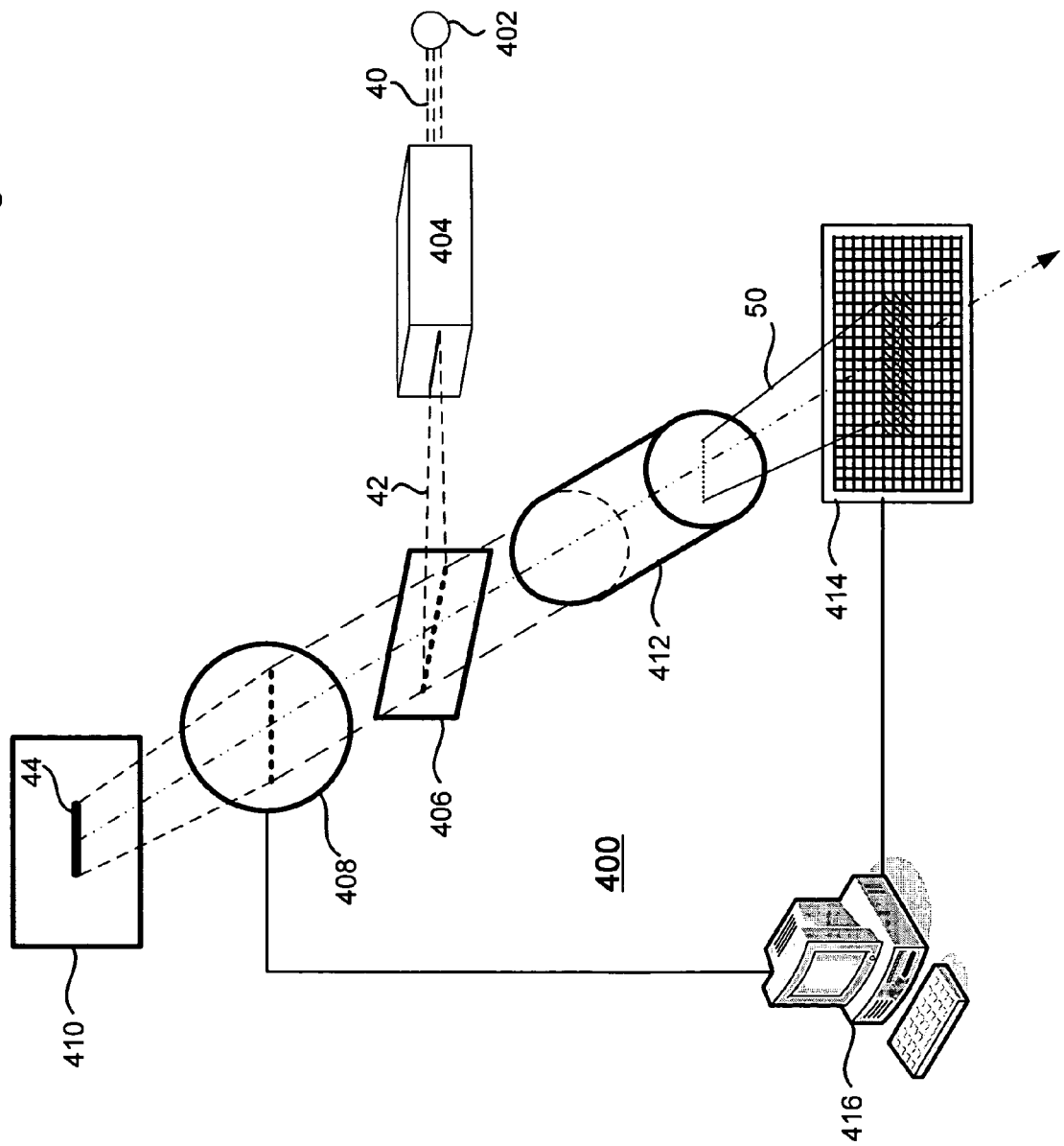
FIG. 4 is a block diagram illustrating an exemplary microscope with an autofocusing function according to an embodiment of the present invention.

FIG. 4 is a block diagram illustrating an exemplary microscope 400 with an autofocusing function according to an embodiment of the present invention. The microscope 400 may comprise one or more light sources 402 that are capable of generating one or more light beams either for image acquisition (e.g., fluorescence excitation) or for autofocusing. A light beam 40 may be selected from the one or more light sources 402 with, for example, an optical switch (not shown). The light beam 40 may pass through a beam-shaping module, which, in this example, is a line-forming module 404 that converts the light beam 40 into a light beam 42 diverging in the horizontal direction only. The light beam 42 may be directed by an optical element 406 (e.g., a dichroic mirror or a beam splitter) and then focused by an objective lens 408 to illuminate a line pattern 44 on an object 410. The line pattern 44 may be centered in the field of view of the microscope 400. Light reflecting off the object 410 may pass through the objective lens 408, the beam splitter 406 and a tube lens 412 before forming an image of the line pattern 44 on a pixel-based optical detector 414.

Figure 5:
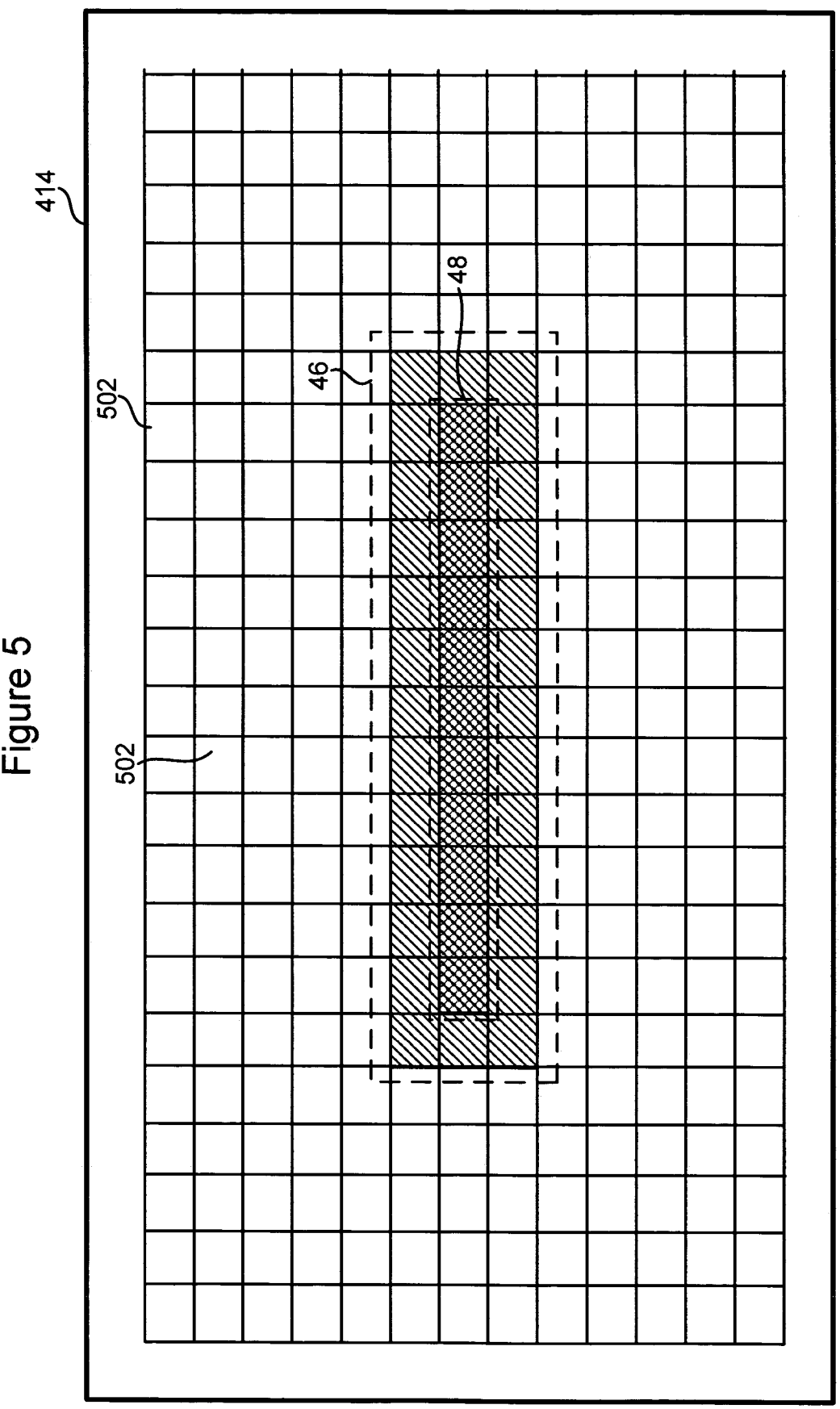
FIG. 5 is a close-up view of a pixel-based optical detector according to an embodiment of the present invention.

FIG. 5 is a close-up view of the pixel-based optical detector 414 according to an embodiment of the present invention. The optical detector 414 may comprise a 2-D array of sensor pixels 502. Each sensor pixel may detect an optical signal incident thereon and have the resulting detection data read out or reset independently from the other sensor pixels. The illuminated line patter 44 may form an image covering a rectangular area 46 in the center of the optical detector 414. The size of the rectangular area 46 depends on overall magnification of the imaging system, and may vary depending on how focused the image is. The more focused the image is, the smaller the rectangular area 46 becomes. During calibration, the size of the sharpest image of the line pattern 44 may be estimated and used as an upper limit to designate a region of interest (ROI) in the center of the optical detector 414. For example, if the area 46 shown in FIG. 5 represents approximately the smallest size observed for the image of the line pattern 44, then an array of sensor pixels of the same or smaller size than the area 46 may be designated as the ROI. For example, either the rectangular area 46 or a slightly smaller rectangular area 48 may be selected to serve as a virtual confocal slit. Light intensity from those pixels located within the virtual confocal slit may be detected and analyzed, while detector data from pixels outside the virtual confocal slit may be either reset or ignored to reject out-of-focus light.

Referring back to FIG. 4, the microscope 400 may further comprise a processor unit 416 which may be a microprocessor, microcontroller, a personal computer (PC), or similar electronic device. Coupled to the optical detector 414 and the objective lens 408, the processor unit 416 may coordinate the movement of the objective lens 408 with the detection of light intensity from the ROI in order to find a best focal position that corresponds to one of the highest light intensities detected. Instead of moving the objective lens 408, the object 410 may be moved with respect to the objective lens 408.

It should be noted that FIGS. 4 and 5 only show the major components in the microscope 400. In practice, more components may be desirable for more satisfactory operations of image acquisition and autofocusing. A preferred embodiment of an optical system for use in the microscope 400 may be found in a related U.S. patent application Ser. No. 11/184,444, filed on Jul. 19, 2005, which is incorporated herein in its entirety.

Figure 6:
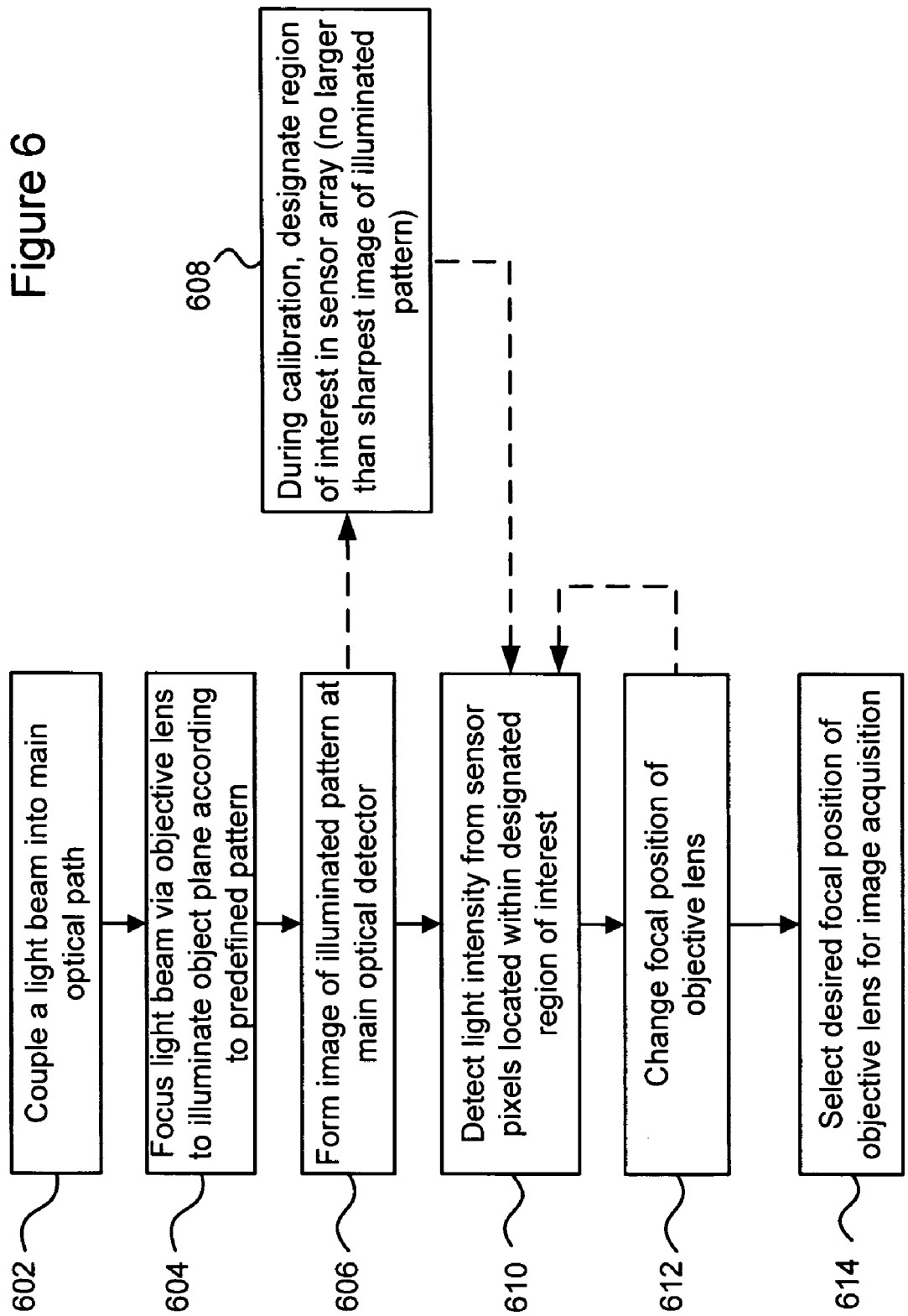
FIG. 6 is a flow chart illustrating an exemplary autofocusing method according to an embodiment of the present invention.

FIG. 6 is a flow chart illustrating an exemplary autofocusing method according to an embodiment of the present invention.

In step 602, an autofocus light beam may be coupled into the main optical path of an automated microscope. The automated microscope may have one or more main light sources for image acquisition. The autofocus light beam may be generated from a light source dedicated to autofocusing and may have a wavelength that is substantially different from the main light sources. Alternatively, the autofocus light beam may be generated from one of the main light sources. Before being coupled into the main optical path, the autofocus light beam may be shaped according to a predefined pattern. According to a preferred embodiment, the light beam may be expanded to form a horizontal line pattern.

In step 604, the autofocus light beam may be focused by an objective lens and may illuminate an object according to the predefined pattern. For example, the autofocus light beam may be focused onto a horizontal line in the center of the microscope's field of view.

In step 606, the illuminated pattern on the object may form an image at a main optical detector of the microscope. The image of an illuminated line pattern is also shaped like a line. The line may be sharp or blurred depending on whether the illuminated line pattern is in focus or out of focus. If perfectly in focus, that is, the object plane coincides with the focal plane of the objective lens, the line may be the narrowest and the brightest. If out of focus to some extent, the line may be thicker and less bright.

The main optical detector may have an array of sensor pixels that are amenable to selective or random data access. During calibration, in step 608, a region of interest (ROI) may be designated in the array of sensor pixels to emulate a confocal aperture. The ROI may be defined in such a way that it overlaps but is no larger than the sharpest image of the illuminated pattern. Therefore, for the illuminated line pattern centered in the field of view, the ROI may be chosen as a narrow and horizontally extending rectangular area centered in the array of sensor pixels.

In step 610, during autofocusing, light intensity may be detected from sensor pixels located within the ROI, while those sensor pixels outside the ROI may be reset. In synchronization with step 610, the relative position of the objective lens may be changed, in step 612, with respect to the object. The relative movement of the objective lens with respect to the object may involve moving the objective lens while keeping the object stationary, moving the object while keeping the objective lens stationary, or moving both the objective lens and the object. The steps 610 and 612 may be repeated such that, for each incremental position within a focus range, the corresponding light intensity in the ROI may be detected.

In step 614, a desired focal position of the objective lens may be selected for the microscope's image acquisition purposes. From the data collected in steps 610 and 612, a relationship of the changes in light intensity with respect to the relative position of the objective lens may be used as a basis for the search of a desired focal position. There may be one or more local maximums in the light intensity detected in the ROI. One of the local maximums may correspond to the best focal position of the objective lens. Other local maximums may be caused by strong reflections at, for example, an air-to-glass or glass-to-fluid interface. Thus, these local maximums may be used to identify the focal positions where the focal plane of the objective lens meets an interface in the object. One of the interfaces may be used as a reference for the focal position of the objective lens. For example, during image acquisition of the microscope, a predetermined offset may be applied to the movement of the objective lens or an object stage in order to bring a sample of interest to the focal plane of the objective lens.

Figure 7:
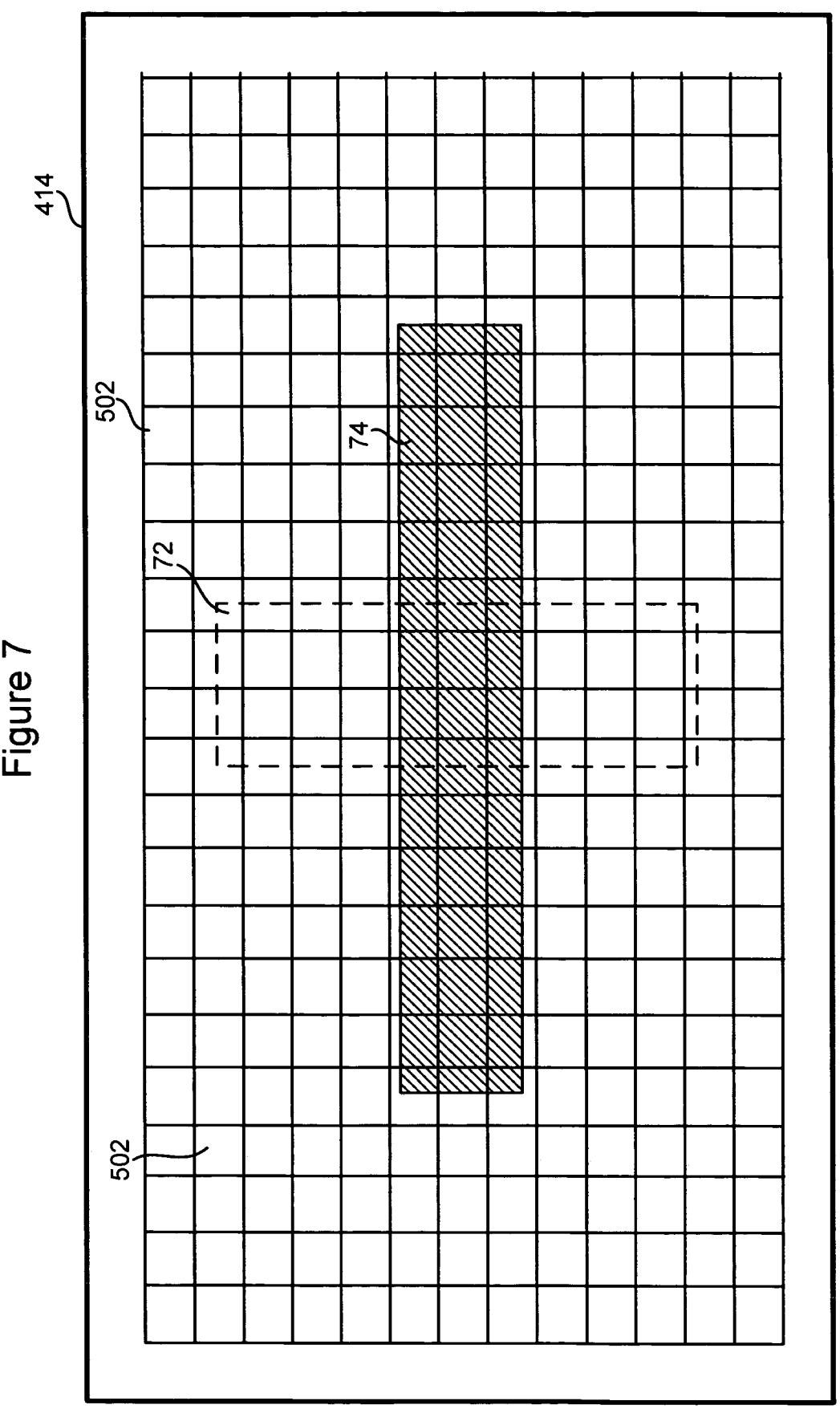
FIG. 7 illustrates another exemplary autofocusing method according to an embodiment of the present invention.

According to embodiments of the present invention, various autofocus illumination patterns may be flexibly combined with various types of ROI's in the optical detector's sensor pixel array, either to serve different operation modes of a microscope or to improve the speed and accuracy in finding a best focus. FIG. 7 illustrates another exemplary autofocusing method according to an embodiment of the present invention. In FIG. 7, there is shown the same optical detector 414 as used in the microscope 400 shown in FIG. 4. The horizontally extending line pattern 44 may form a line-shaped image 74 on the optical detector 414. The ROI in this case may be designated as a vertically extending rectangular area 72. As the focal position of the objective lens 408 is adjusted, the width and light intensity of the line-shaped image 74 may change. Both changes may be captured by the detection data collected from sensor pixels located within the rectangular area 72. The detection data may provide a light intensity distribution along the ROI. As the line-shaped image 74 becomes more in focus, the light intensity becomes more concentrated in the center. Compared with the above-described autofocusing method which is based on light intensity detection in an emulated confocal aperture, the exemplary method illustrated in FIG. 7 may provide more information associated with the focal position of the objective lens 408. For example, based on the width of the line-shaped image 74 and/or how fast the width changes, it may be predicted as to how far away the objective lens 408 is from its optimal focal position. Accordingly, the movement of the objective lens 408 may be sped up or slowed down. As a result, the search for the best focus may become faster and more accurate.

It should be noted at this point that, despite the foregoing specific examples, the autofocusing technique in accordance with embodiments of the present invention may be adapted for a wide variety of microscopes. For example, those skilled in the art may appreciate that the autofocusing technique disclosed herein may be applicable to both wide-field microscopes and confocal microscopes, and the microscopes may operate in either a fluorescence mode or a non-fluorescence mode.

While the foregoing description includes many details, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A method for adjusting focus in an automated microscope, the method comprising:
   providing an optical detector for image acquisition, wherein the optical detector comprises an array of sensor pixels;
   designating a region of interest in the array of sensor pixels to emulate a virtual confocal aperture;
   directing a light beam to focus and illuminate an object according to a diffraction limited point configured to reject out of focus light thereby forming an image of the illuminated diffraction limited point at the optical detector, wherein the image of the illuminated diffraction limited point substantially overlaps the designated region of interest;
   detecting a light intensity from sensor pixels located within the designated region of interest based on the optical detector being configured to have random access capability for selective detection of the light intensity; and
   adjusting a relative focal position of an objective lens based on the detected light intensity.

2. The method according to claim 1, further comprising:
   selecting, for image acquisition, the relative focal position that corresponds to a peak in the light intensity detected.

3. The method according to claim 1, wherein the step of designating the region of interest further comprises:
   calibrating the emulated virtual confocal aperture such that a sharpest image of the illuminated pattern, formed at the optical detector, is no smaller than the designated region of interest.

4. The method according to claim 1, further comprising:
   resetting or ignoring sensor pixels that are located outside the designated region of interest.

5. The method according to claim 1, wherein:
   the automated microscope operates in a line-confocal mode; and
   the predefined pattern has a shape of a straight line and is centered in a field of view.

6. The method according to claim 1, wherein the optical detector is selected from a group consisting of:
   a CMOS optical detector; and
   a CCD camera.

7. The method according to claim 1, wherein the light beam is dedicated to autofocusing and has a wavelength that is different from a light source employed by the automated microscope for image acquisition.

8. The method according to claim 1, further comprising:
   identifying one or more interfaces on or near the object by detecting changes in the light intensity while adjusting the relative focal position of the objective lens.

9. The method of claim 1, wherein the diffraction limited point is a diffraction limited line.

10. An automated microscope comprising:
    at least one light source that generates a light beam;

an optical path and an optical detector for image acquisition, wherein the optical path has an objective lens therein, and wherein the optical detector comprises an array of sensor pixels;

a motion mechanism capable of moving the objective lens within a focus adjustment range; and a processor module coupled to the optical detector and the motion mechanism;

wherein:

the processor module designates a region of interest in the array of sensor pixels to emulate a virtual confocal aperture, the optical path directs the light beam to focus and illuminate an object according to a diffraction limited point configured to reject out of focus light thereby forming an image of the illuminated diffraction limited point at the optical detector, wherein the image of the illuminated diffraction limited point substantially overlaps the designated region of interest, and the processor module determines a desired relative focal position of the objective lens by coordinating the movement of the objective lens and detection of light intensity from sensor pixels located within the designated region of interest based on the optical detector being configured to have random access capability for selective detection of the light intensity.

11. The automated microscope according to claim 10, wherein the processor module selects, for image acquisition, the relative focal position that corresponds to a peak in the light intensity detected.

12. The automated microscope according to claim 10, wherein the processor module calibrates the emulated virtual confocal aperture such that a sharpest image of the illuminated pattern, formed at the optical detector, is no smaller than the designated region of interest.

13. The automated microscope according to claim 10, wherein the processor module resets or ignores sensor pixels that are located outside the designated region of interest.

14. The automated microscope according to claim 10, wherein:

the automated microscope operates in a line-confocal mode; and the predefined pattern has a shape of a straight line.

15. The automated microscope according to claim 10, wherein:

the automated microscope operates in a point-confocal mode; and the predefined pattern has a point-like shape.

16. The automated microscope according to claim 10, wherein:

the automated microscope operates in a wide-field mode; and the predefined pattern has a point-like shape.

17. The automated microscope according to claim 10, wherein the optical detector is selected from a group consisting of:

a CMOS optical detector; and a CCD camera.

18. The automated microscope according to claim 10, wherein the light beam is generated by an autofocus light source and has a wavelength that is different from a light source employed by the automated microscope for image acquisition.

19. The automated microscope according to claim 10, wherein the processor module identifies one or more interfaces on or near the object by detecting changes in the light intensity while adjusting the relative focal position of the objective lens.

20. The method of claim 10, wherein the diffraction limited point is a diffraction limited line.

* * * * *